(12) United States Patent  
Smus et al.

(10) Patent No.: US 9,237,182 B1  
(45) Date of Patent: Jan. 12, 2016

(54) SITUATED MULTI-PERSON USER INTERFACE

(71) Applicants: Boris Smus, San Francisco, CA (US); Alejandro J. Kauffmann, San Francisco, CA (US); Christian Plagemann, Menlo Park, CA (US)

(72) Inventors: Boris Smus, San Francisco, CA (US); Alejandro J. Kauffmann, San Francisco, CA (US); Christian Plagemann, Menlo Park, CA (US)

(73) Assignee: GOOGLE INC., Mountain View, CA (US)

( * ) Notice: Subject to any disclaimer, the term of this patent is extended or adjusted under 35 U.S.C. 154(b) by 267 days.

(21) Appl. No.: 13/829,798

(22) Filed: Mar. 14, 2013

(51) Int. Cl.  
*G06F 3/14* (2006.01)  
*H04L 29/08* (2006.01)

(52) U.S. Cl.  
CPC ...................................... *H04L 67/02* (2013.01)

(58) Field of Classification Search  
CPC ...................................... G06F 3/14; G06F 3/17  
USPC ...................... 715/753; 700/258; 348/51, 231; 382/103, 107  
See application file for complete search history.

(56) References Cited

U.S. PATENT DOCUMENTS

| | | | | |
|---|---|---|---|---|
| 2002/0003575 | A1* | 1/2002 | Marchese | 348/231 |
| 2009/0037023 | A1* | 2/2009 | Togawa et al. | 700/258 |
| 2010/0158315 | A1* | 6/2010 | Martin | 382/103 |
| 2011/0293148 | A1* | 12/2011 | Kobayashi | 382/107 |
| 2015/0009304 | A1* | 1/2015 | Linge et al. | 348/51 |

* cited by examiner

*Primary Examiner* — Ruay Ho  
(74) *Attorney, Agent, or Firm* — McDermott Will & Emery LLP

(57) ABSTRACT

Systems and methods for a situated multi-user environment are provided. In one aspect, the method includes a step for receiving a user event message for a first user based on data received by a data source. The method also includes a step for updating a display based on the received user event message for the first user, wherein the display provides an indication of a relative physical location of the first user amongst a group of users within a certain proximity of each other. The method also includes a step for receiving a command from a first user to share a content item with a second user in the group of users. The method also includes a step for providing access to the shared content item to a device of the second user.

17 Claims, 6 Drawing Sheets

SITUATED MULTI-PERSON USER INTERFACE

BACKGROUND

The subject technology is generally directed to improving the digital experience of a group of users that are within close proximity of each other ("co-located").

When people are physically co-located, they can easily share objects, speak to each other, ask each other questions, and collaborate on projects and plans. In a digital context, the physical location of people relative to each other generally has no impact on their digital experience. For example, the same steps are required to digitally share a photo with somebody who is sitting next to a user sharing the photo as would be required to digitally share the photo with somebody else who may be thousands of miles away from the user sharing the photo. This uniform ability to share may be an advantage when interacting with people who are far away, but may be an inefficiency when, for example, sharing an e-book with someone standing next to a user requires the user to log into at least one device, find a file, choose a transfer method, pick a recipient for the transfer method, and send the file to the recipient.

SUMMARY

In some aspects, the disclosed subject matter relates to a computer-implemented method for a situated multi-user environment. The method includes a step for receiving a user event message for a first user based on data received by a data source. The method also includes a step for updating a display based on the received user event message for the first user, wherein the display provides an indication of a relative physical location of the first user amongst a group of users within a certain proximity of each other. The method also includes a step for receiving a command from a first user to share a content item with a second user in the group of users. The method also includes a step for providing access to the shared content item to a device of the second user.

In some aspects, the disclosed subject matter relates to a system for a situated multi-user environment. The system includes one or more processors and a memory. The memory includes instructions that when executed by the one or more processors cause the processors to receive a first set of user events for a plurality of users within a certain physical proximity of each other. The instructions also cause the one or more processors to update a first graphical display based on the received first set of user events, wherein the first graphical display provides an identification of each user in the plurality of users and a relative position of each user in the plurality of users. The instructions also cause the one or more processors to update a second graphical display based on the received first set of user events, wherein the second graphical display provides an aggregated content view, wherein the aggregated content view is based on content for each user in the plurality of users.

In some aspects, the disclosed subject matter relates to a computer-readable medium encoded with executable instructions for providing a situated multi-user environment. The instructions include code for receiving data from one or more data sources for a first person. The instructions also include code for defining determining the identity of the first person based on the received data. The instructions also include code for providing a user event message based on the determined identity of the first person. The instructions also include code for receiving the user event message. The instructions also include code for providing a graphical update for the first person based on the received user event message.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
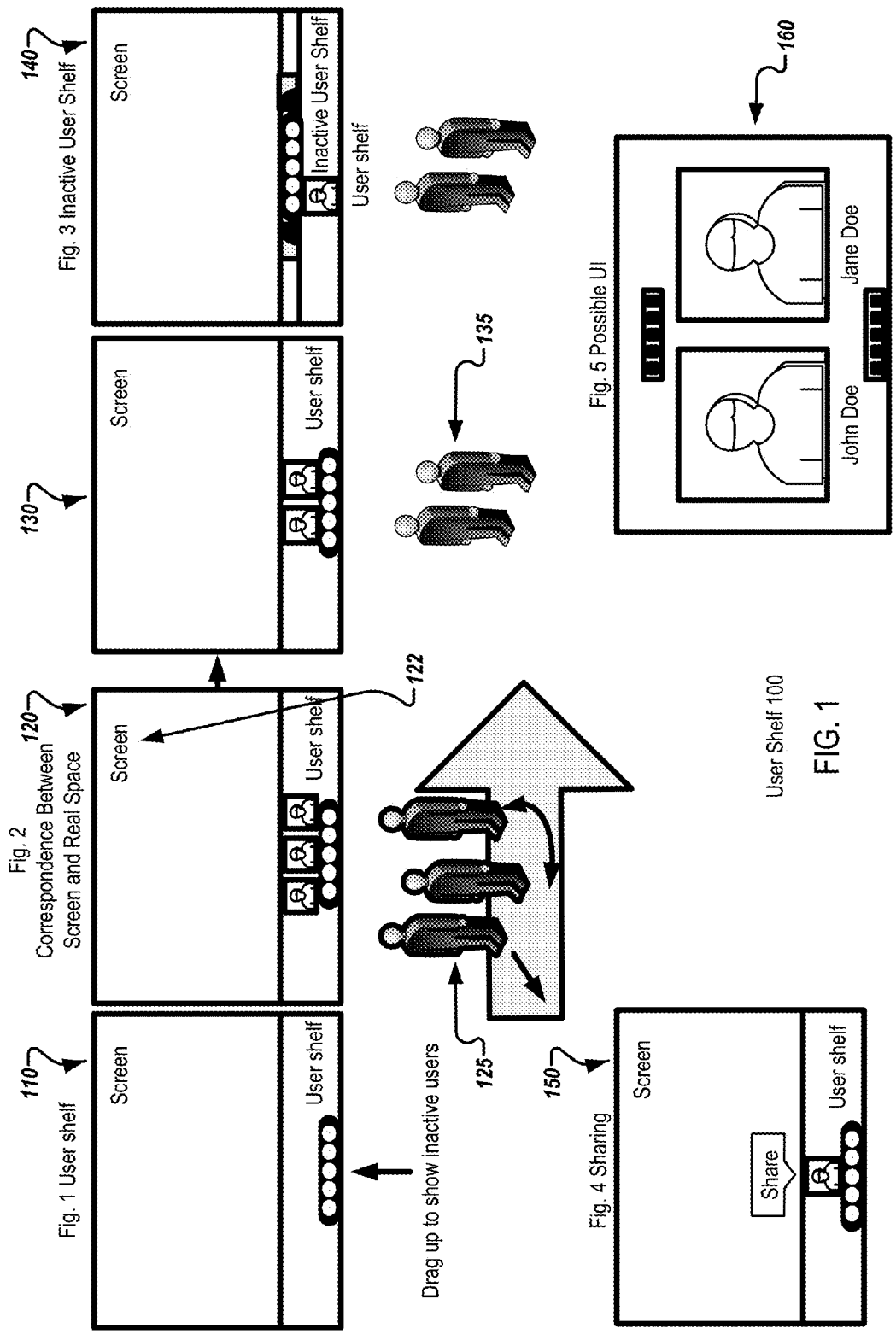
FIG. 1 illustrates an example of a user interface for a situated multi-user system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology provides techniques for utilizing a determination of a physical proximity of a group of users to each other to enhance the digital experience for one or more users in the group. In some aspects, a display provides a graphical representation of each user within a group of users determined to be within a certain proximity of each other, for example, within a camera's viewport. The display may identify each user in the group (e.g., a picture may be associated with each user), and may identify the relative position of the users in the group. The display may be referred to herein as a "user shelf." The graphical representation for each user may be referred to herein as an avatar of the respective user. The subject technology or system for implementing the subject technology may be referred to herein as a situated multi-user environment or system.

The user shelf may be updated, for example, upon the detection of a new user that enters the camera's viewport, upon the detection of a user leaving the camera's viewport, upon the identification of a user in the group of users, or upon the detection of a change in position of one or more users in the group. The subject technology may employ face tracking or face identification software or hardware in order to provide a shared digital experience for the group of users within the camera's viewport.

The subject technology may employ devices other than cameras for detecting a presence of a user. For example, very precise indoor device location techniques or ad-hoc mesh network/home technologies may be used to detect the presence of a user. Triangulation techniques may include time of arrival (TOA) or time difference of arrival (TDOA) laterration techniques, a received signal strength (RSS) or Signal Attenuation-Based method, a roundtrip time of flight (RTOF) method, a received signal phase or phase of arrival (POA) method and angulation techniques (e.g., AOA estimation). Scene analysis techniques may include probabilistic methods, kNN averaging, neural networks, SVM (e.g., support vector classification (SVC), support vector regression (SVR)) and SMP. In addition, proximity algorithms may be used. Alternative technologies may include global positioning system (GPS), radio frequency identification (RFID), cellular-based systems (e.g., GSM, CDMA), ultra wide band (UWB), wireless local area network (WLAN), Bluetooth, ultra high frequency (UHF), multiple media, cordless phone systems and wireless sensor networks. These and other techniques and/or technologies for detecting the presence of people may be utilized for the subject technology without deviating from the scope of this disclosure.

FIG. 1 illustrates an example of a user shelf 100. User shelf 100 is a graphical user interface that provides a display for a situated multi-user environment that captures information about multiple users within a certain proximity of each other. For example, a camera may be installed in a conference room, and data received by the camera, e.g., as participants of a meeting to be held in the conference room enter and exit the conference room, may be used to update the display in user shelf 100. User shelf 100 may be implemented as a browser application or a stand-alone application.

User shelf 110 represents a state of the situated multi-user environment in which no users have been detected in a particular environment. For example, user shelf 110 may represent the state of users in the conference room example provided above prior to any attendees entering the conference room, e.g., before the start of the meeting scheduled for the conference room.

User shelf 120 represents a state of the situated multi-user environment in which three users have been detected in a particular environment. The user shelf 120 is shown to correlate to three users 125 and their respective positions in the environment. For example, user shelf 120 may represent the state of users in the conference room example provided above after three attendees 125 have entered the conference room and have been detected by the camera installed in the conference room. User shelf 120 is shown to depict three users in the user shelf that correspond to the three users 125, including their respective positions to each other, e.g., their respective physical position or location to the left and right of one another. The three users are depicted in the user shelf 120 via a colored icon, one for each user. The icons may contain a picture or other images associated with each user.

User shelf 120 is also shown to contain a screen area 122. The screen area 122 may display content being shared amongst the multiple users of the situated multi-user environment. For example, the multiple attendees in the conference example provided above may view a webpage or a video together via a browser application open in the screen area 122.

In some aspects, the screen area 122 may display an aggregated content view. The aggregated content may be combined content retrieved for each user found to be within a certain proximity of each other, and the aggregated content may be provided for display in the screen area 122. For example, a calendar content item for each user may be aggregated to display an aggregated calendar for the group of users, thereby identifying calendar items for all users in the group in a single view. As another example, a group of users may be listening to music, and as a new user is detected within the camera's viewport, a music playlist associated with the new user may be automatically shared on the screen area 122 with the group of users to select and play. The content that is shared in the screen area 122 of user shelf 120 may be based on other applications or data sources without deviating from the scope of this disclosure.

Although the screen area 122 for content being shared by multiple users is shown to be a part of user shelf 100, it may be detached and provided in an independent graphical user interface. For example, the screen area 122 may be a browser application's display and detached from user shelf 100, and the user shelf 100 may be a separate graphical user interface for providing information about multiple people in a particular environment.

User shelf 130 represents a state of the situated multi-user environment in which two users are detected in a particular environment. The user shelf 120 is shown to correlate to two users 135 and their respective positions in the environment. For example, user shelf 120 may represent the state of users in the conference room example provided above where two attendees 135 remain in the conference room, e.g., because one of the attendees 125 exited or left the conference room.

User shelf 140 further represents the state of the situated multi-user environment as described for user shelf 130, with additional graphical user interface details that show that an inactive user shelf may also be provided. An inactive user shelf may provide information about users that have been detected for a particular environment but that are no longer within the environment, e.g., as discussed for one or more users that may have exited the conference room in the example above.

User shelf 150 represents a state of the situated multi-user environment in which a user has indicated a request to share content with a user in the user shelf 100. The user shelf 150 is shown with a graphic bubble stating "share" over a user icon for a user with whom content is being shared. For example, user shelf 150 may represent the state of users in the conference room example provided above in which one of the attendees in the meeting of the conference room issues a request to share some content with another attendee in the user shelf. The command may be issued, e.g., by dragging a content piece displayed in the screen area 122 of user shelf 110 onto one or more users depicted in the user shelf 100.

Figure 2:
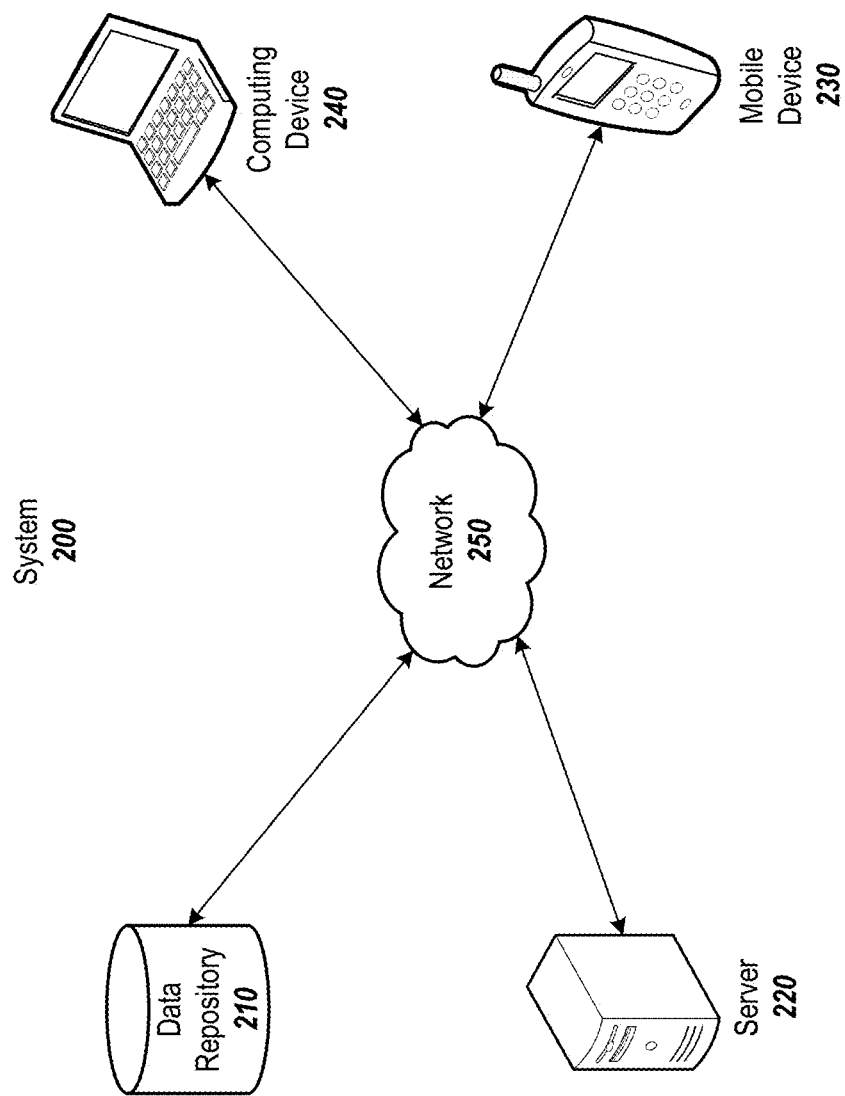
FIG. 2 illustrates an example of a computer system configured for a situated multi-user environment.

FIG. 2 illustrates an example of a computer system 200 configured to provide a system for a situated multi-user environment. As shown, the computer system 200 includes a data repository 210, a server 220, a mobile device 230 and a computing device 240. Data repository 210, although shown as a database, may be any other type of data repository (e.g., a relational database, an object-oriented database, a web application server, a file, or any other data storage) that can maintain and provide data needed for a situated multi-user environment. The data repository 210, the server 220, the mobile device 230, and the computing device 240 may be configured to communicate with one another via a network 250. The network 250 may include the Internet, an intranet, a local area network, a wide area network, a wired network, a wireless network, a cellular network, a WiFi network, or a virtual private network (VPN).

The data repository 210 may store data (e.g., data for detecting the presence of people, e.g., camera data, data that helps identify a person, etc.) related to a system for a situated multi-user environment. The database may include a single machine, multiple machines, a single processor system, or a multi-processor system.

The server 220 may include a detection module 310, an identification module 320, and a display module 330. The server 220 may be implemented as a single machine with a single processor, a multi-processor machine, or multiple machines with multiple processors. One example of the server 220 is described in more detail in conjunction with FIG. 3 below.

The mobile device 230 may be a mobile phone, a personal digital assistant (PDA), a tablet computer, a netbook, or a laptop computer. The mobile device 230 may be portable and may often times be carried by a user, for example, in a pocket, a purse, a backpack, or a briefcase. The mobile device 230 may have access to a browser or other application for a situated multi-user system. While only one mobile device 230 is illustrated in FIG. 2, the subject technology may be implemented in conjunction with one or more mobile devices 230, e.g., that displays a user shelf as described for FIG. 1 above.

The computing device 240 may be a laptop computer, a desktop computer, a mobile phone, a personal digital assistant (PDA), a tablet computer, a netbook, a television with one or more processors embedded therein or coupled thereto, a physical machine, or a virtual machine. The computing device 240 may include one or more of a keyboard, a mouse, a display, or a touch screen. The computing device 240 may have access to a browser or other application for a situated multi-user system, e.g., that displays a user shelf as described for FIG. 1 above.

While each of the data repository 210, the server 220, the mobile device 230, and the computing device 240 are illustrated in FIG. 2 as separate machines, in example aspects, one or more of the data repository 210, the server 220, the mobile device 230, and the computing device 240 may be implemented as a single machine. For example, the functions of the data repository 210 and the server 220 may be implemented within a single machine.

Figure 3:
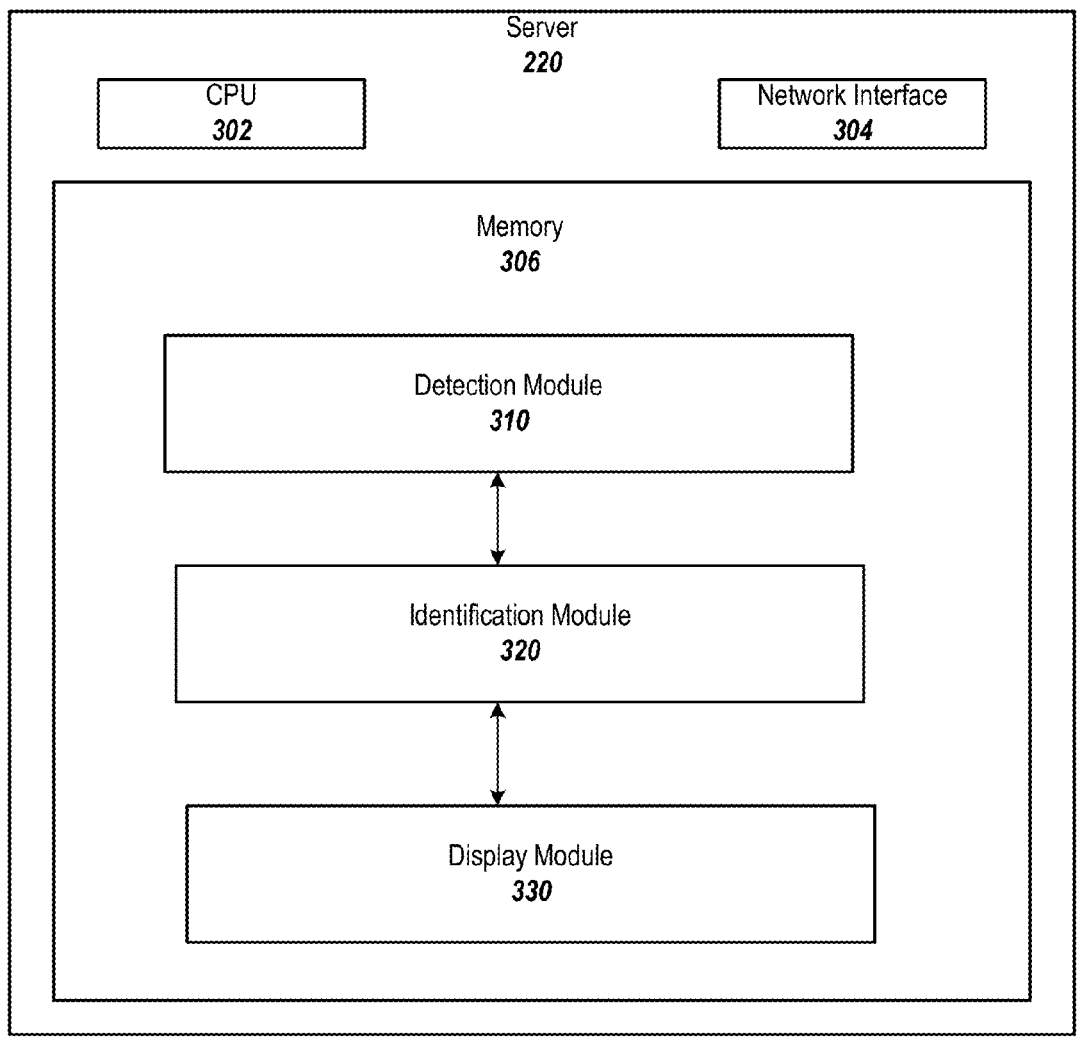
FIG. 3 illustrates an example of a server of FIG. 2.

FIG. 3 illustrates an example of the server 220 of FIG. 2. As shown, the server 220 includes a processor 302, a network interface 304, and a memory 306. The processor 302 is configured to execute computer instructions that are stored in a computer-readable medium, for example, the memory 306. The processor 302 may be a central processing unit (CPU). While only one processor 302 is illustrated, the server 220 may include multiple processors. Furthermore, while the server 220 is illustrated as a single machine, the server 220 may include multiple machines or portions of computing power available on the cloud. The network interface 304 is configured to allow the server 220 to transmit and receive data in a network, e.g., network 250 of FIG. 2. The network interface 304 may include one or more network interface cards (NICs). The memory 306 may store data or instructions. As illustrated, the memory 306 includes a detection module 310, an identification module 320, and a display module 330.

Detection module 310 is configured to receive data that aids in identification of a person in a situated multi-user environment. For example, detection module 310 may receive camera data for a particular room or area in which the camera is installed. The camera data may include visual data about users that enter or exit the area. The data may be received periodically by the detection module 310. Detection module 310 may also be configured to receive data for the situated multi-user environment that is from a source other than a camera or data that is other than visual data. For example, detection module 310 may receive data from very precise indoor device location techniques or ad-hoc mesh network/home technologies that helps in ascertaining the identity of a user in a particular environment. The detection module 310 may be configured to provide some or all of the received data to an identification module 320. Detection module 310 may store the received data, e.g., in data repository 210 of system 200.

The identification module 320 may be configured to receive data from detection module 310. For example, detection module 310 may receive visual data from one or more cameras and provide it to identification module 320. In some aspects, identification module 320 may query a data repository, e.g., a data repository 210 of system 200 that maintains data received by detection module 310, for data needed for user identification. Identification module 320 is configured to utilize the received or queried data for identification of a user and translation into a user event. In some aspects, identification module 320 processes the received data and determines the identity of the user and a physical status of the user, e.g., entering a particular space, leaving the particular space, position change in the particular space, etc.

The user event may, for example, include a new user entering a viewport of one of the one or more cameras, a user leaving the viewport of one of the one or more cameras, one or more users moving, or identification of a certain user. The translated user events may then be broadcasted or otherwise communicated for consumption by various applications. For example, a browser or other application may listen for user events and may update a display, such as the user shelf 100, based on received user events. In some aspects, a user event may be the identification of a user. In some aspects, the user event may include user identity information (e.g., a user or account login or other identifier) and information about the physical status of the user as described above.

The identification module 320 may use various facial tracking or other algorithms for identifying a user. The identification module 320 may access various data repositories or systems in order to ascertain the identity of a user in the situated multi-user environment. The identification module 320 may utilize various user identification algorithm or systems without deviating from the scope of this disclosure.

The display module 330 may be configured to receive user events, e.g., as broadcasted or otherwise communicated by the identification module 320. The display module 330 may be configured to provide graphical updates related to a received user event to one or more client computing devices, e.g., a computing device 240 or mobile device 230 that is configured to receive data for a situated multi-user environment. The computing device 240 or mobile device 230 may be configured with a browser or other application having capabilities for a situated multi-user environment, e.g., capable of displaying a user shelf 100 as discussed above for FIG. 1. The browser or other application having capabilities for the situated multi-user environment may also be capable of allowing users to share content with each other via the application.

Display module 330 may be configured to provide an initial user interface for a situated multi-user environment, e.g., as discussed above for user shelf 110 of FIG. 1. Display module 330 may be configured to provide updates for an initial user interface as user events are received, e.g., representing the various user shelf states 120, 130, 140, and 150 discussed in reference to FIG. 1 above. Applications for a situated multi-user environment, e.g., as accessible by computing device 240 or mobile device 230, may receive updates for a user shelf and update the display accordingly.

Users of the situated multi-user application may then issue a command to share a piece content with one or more users in the user shelf. In other aspects, content for multiple users of the user shelf may be aggregated and displayed in a screen area of the computing device 240 or mobile device 230.

In some aspects, the context of people nearby may be used as a means for improving the behavior of a given application. For example, upon the determination that a first set of users is within a certain proximity of each other, an instant chatting application on a device accessible by a user within the first set of users may be updated to remove all other users within the first set of users from a contact list of the chat application. This may be a desired behavior because it is unlikely that a user would want to chat using an instant messaging application with another user near the user.

In some aspects, a user in the group of users determined to be within a certain proximity of each other may issue a command to share a content item with one or more other users in the group of users, e.g., as depicted in a user shelf 100. The command for sharing content may be issued, for example, by tapping on or dragging the content item onto the graphical representation of the one or more users with whom the user wishes to share content. In other aspects, the command for sharing content may be issued by an input device (e.g., a keyboard or other pointing device) coupled to the display. Yet in other ways, a command may be issued by voicing the command to share the content items with the one or more users (e.g., one of the users may say "share photo with all users in my group"). The command for sharing the content item may lead to providing access to the content to one or more users in the group of users. For example, a link or an attachment to the content item may be provided to a device of the one or more users with whom the content is being requested to share.

Although display module 330 is depicted as a server 220 component in FIG. 3, display module 330 may be a client side component. For example, the applications for a situated multi-user environment as discussed above may have a display module 330 component. The client-side display module 330 component may then update a user shelf similar to the server-side display module 330 discussed in reference to FIG. 3.

The determination that a user is within a certain proximity of a set of users may be based on people detected by a data source (e.g., within a camera's viewport), or detected within a certain physical boundary (e.g., within a conference room using an appropriate detection device). Additionally, the concept of a group of people determined to be within a certain proximity of each other is not necessarily based on physical proximity to one other. In some aspects, a group of people may be determined to be near each other based on a certain statistical confidence level in the identification of the person. For example, in one instance if a person's identity is determined by a recognition algorithm to be within a 90% confidence level, then the person may be considered to be near enough.

Figure 4:
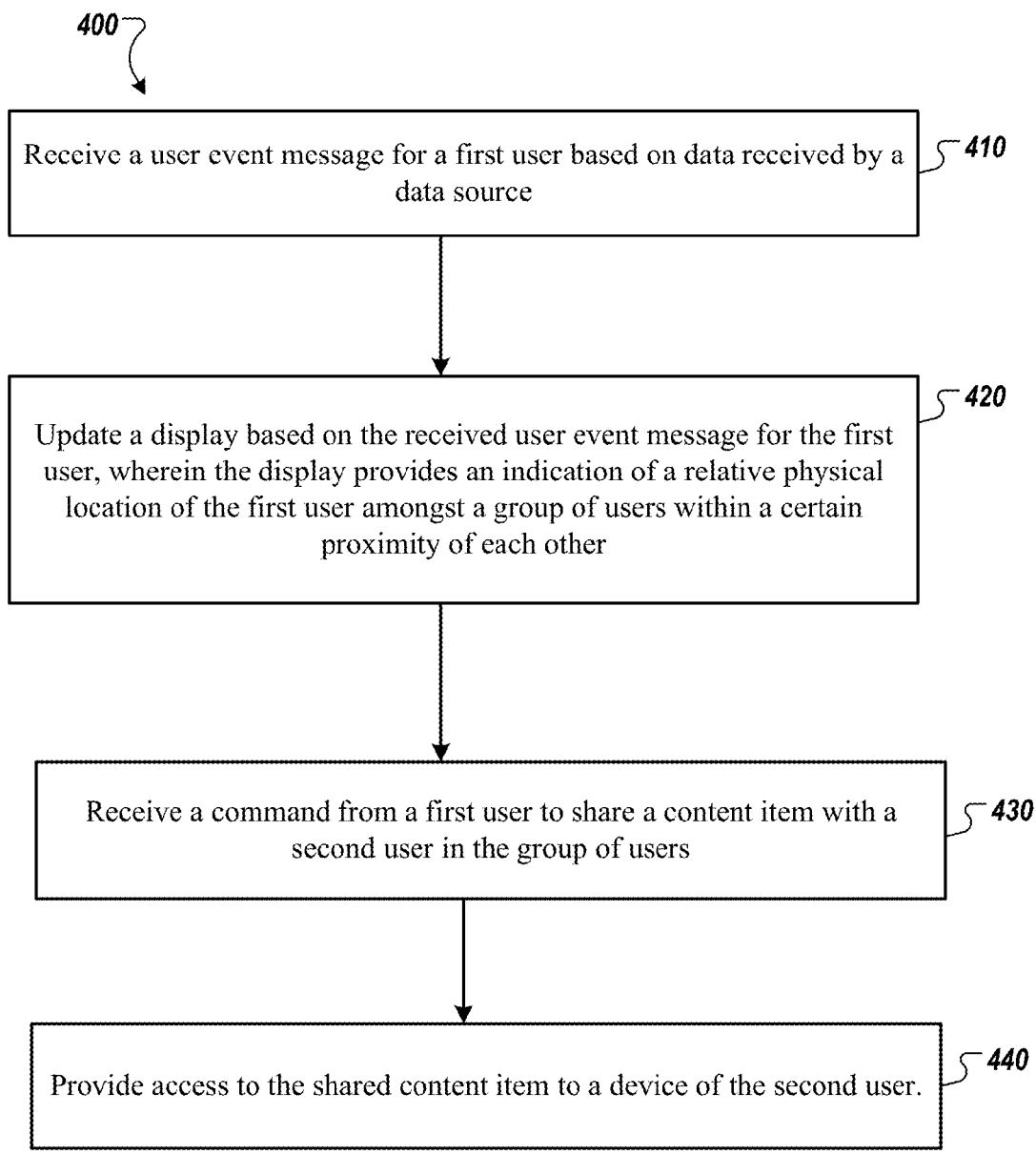
FIG. 4 illustrates an example process by which content may be shared in a situated multi-user system.

FIG. 4 illustrates an example process 400 by which content may be shared in a situated multi-user system.

The process 400 begins at step 410, where a user event message for a first user is received based on data received by a data source. For example, an identification module 320 may broadcast a user event message based on data received by a detection module 310 as discussed above. The user event message may be received at an application for a situated multi-user system, e.g., as accessible by a computing device (e.g., computing device 240). The user event message may indicate the status of one or more users in an environment. For example, the received event message may provide that a new user has entered a camera's viewport, or that a user has left the camera's viewport, or that a user within the camera's viewport has been identified as a particular user, or that a change in position has been detected for one or more users in within the camera's viewport, or some combination thereof. The received user event may be based on data received by one or more cameras installed in a particular area.

In step 420, a display based on the received user event message for the first user is updated. The display provides an indication of a relative physical location of the first user amongst a group of users within a certain proximity of each other, e.g., as discussed for user shelf 100 of FIG. 1. The update of the display may include providing a relative position of the first user amongst a group of users of the user shelf 100. The update of the display may include providing a picture or other representation of the first user in the user shelf 100. The update may include moving the first user to an inactive shelf of users where the user event is indicative of the first user leaving or exiting a certain area, e.g., as discussed for user shelf 140 of FIG. 1.

In step 430, a command from a first user to share a content item with a second user in the group of users is received. For example, one of the users of user shelf 100 may issue a command to share content with one or more other users of the use shelf 100 as discussed above by, e.g., by dragging a piece of content accessible in a screen area 122 onto an icon or other graphical representation for the one or more users with whom the content item is being requested to share.

In step 430, access to the shared content item is provided to a device of the second user. For example, a link or attachment of the content item may be sent to an email or chat application for access by the second user on the second user's device.

Figure 5:
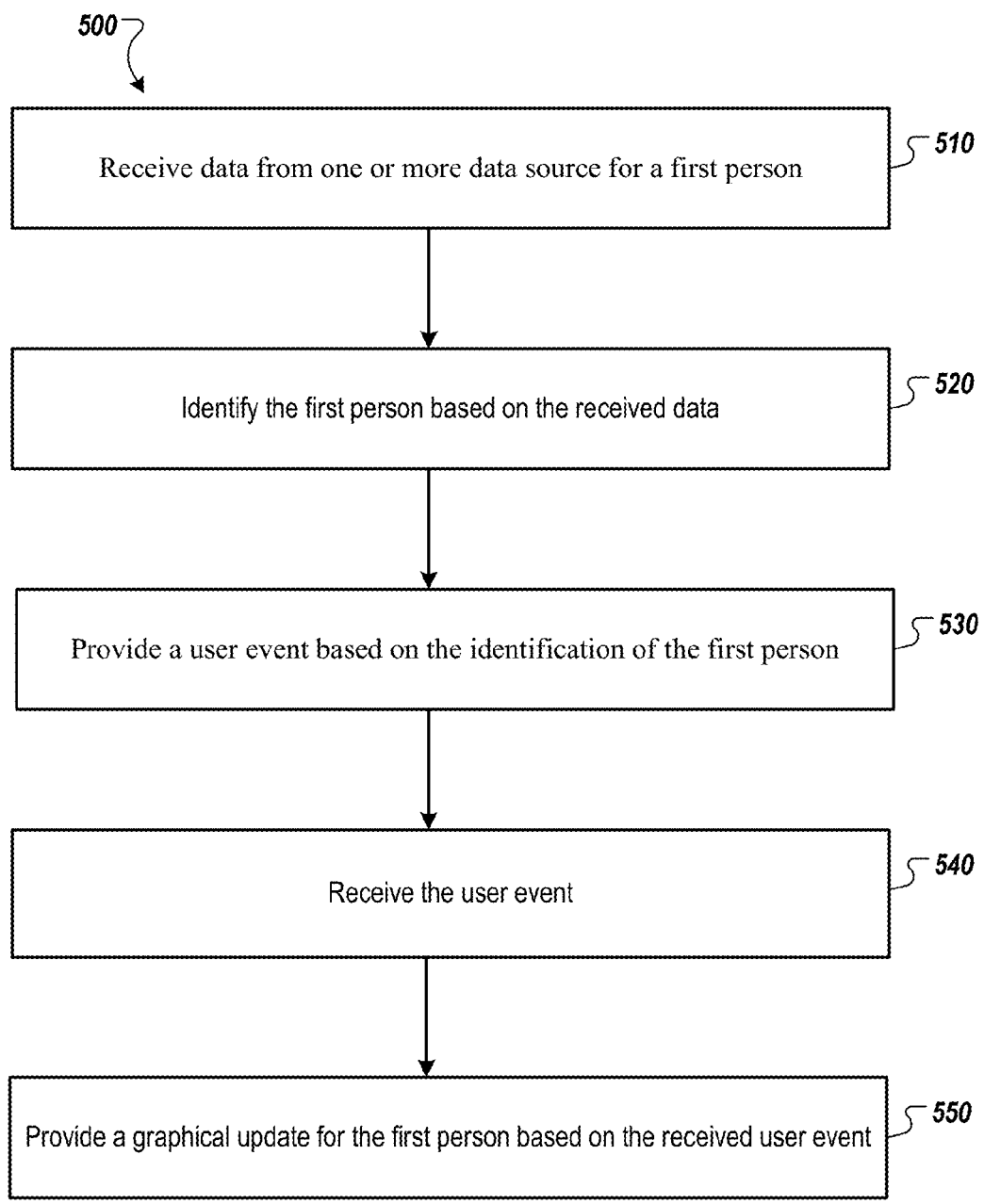
FIG. 5 illustrates an example process for processing information in a situated multi-user system.

FIG. 5 illustrates an example process for processing information in a situated multi-user system.

The process 500 begins at step 510, where a server process receives data from one or more data sources for a first person. For example, detection module 310 of FIG. 3 may receive data from a camera installed in a conference room. The data received may be for the first user that entered the camera's viewport, e.g., upon walking into a conference room where the camera is installed.

In step 520, the first person is identified based on the received data. For example, identification module 320 of FIG. 3 may process received data in order to determine the identity of the first person. Identification module 320 may utilize various algorithms, data repositories, and systems to ascertain the identity of the first person.

In step 530, a user event based on the identification of the first person is provided. For example, identification module 320 may broadcast a user event upon the determination of the identity of the first person. Additionally, the user event may indicate a status in reference to the first person. For example, identification module 320 may ascertain that the first person has either entered, left, or moved within a certain area, e.g., the camera's viewport. The user event may also contain information about the relative position of the first person, relative to other persons with the certain area.

In step 540, the user event provided at step 530 is received. For example, the user event may be received by one or more applications or server side components that have a display module 330 and that is listening for user events.

In step 550, a graphical update is provided for the first person based on the received user event. For example, the display module 330 that receives the user event may provide a graphical update for a user shelf displayed on a client computing device.

In various aspects, the subject disclosure provides for accessing information stored about users (e.g., visual or other user data, user identification data, etc.). In such cases, a user may opt-out of having the system (e.g., a server or a data repository) store the user information or the user may need to provide affirmative permission to have the system store or access the user information as discussed for the various aspects.

Figure 6:
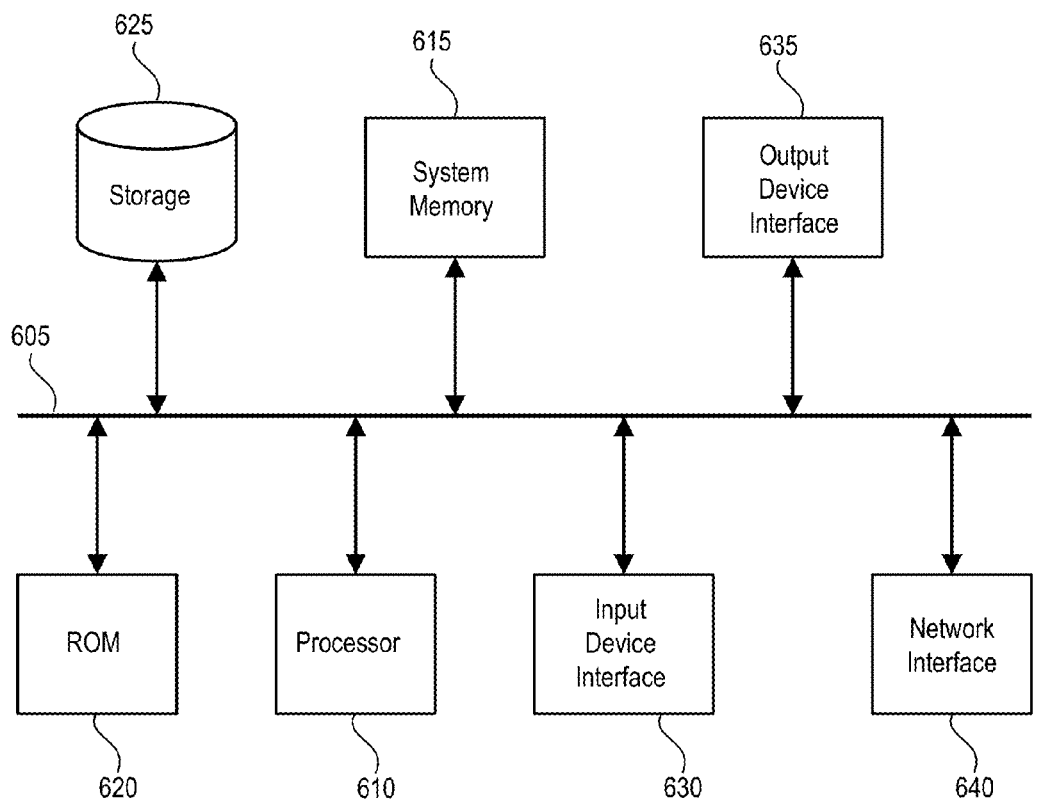
FIG. 6 conceptually illustrates an example electronic system with which some implementations of the subject technology are implemented.

FIG. 6 conceptually illustrates an electronic system 600 with which some implementations of the subject technology are implemented. For example, one or more of the server 120 or the client computing device 140 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example, a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for providing access to a set of applications to a user of computing device based on determined user categories. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touch screen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer," "server," "processor," and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a LAN, a WAN, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method comprising:
receiving, by one or more processors, data from one or more data sources for a first user of a group of users within a certain physical proximity of each other;

determining, by one or more processors, the identity of the first user based on the received data, wherein the determining of the identity of the first user is based on an identification of the first user being within a statistical confidence level;

receiving, by one or more processors, an indication for the first user;

providing, by one or more processors, a graphical update for the first user based on the received indication;

receiving, by one or more processors, a request from the first user to share a content item with a second user in the group of users; and providing, by one or more processors, access to the shared content item to a device of the second user.

2. The method of claim 1, wherein the access to the shared content item is provided by providing a link providing access to the shared content item or attachment comprising the shared content item to the device of the second user.

3. The method of claim 1, wherein the access to the shared content item is provided by sending an instant message comprising a link providing access to the shared content item or attachment comprising the shared content item to the device of the second user.

4. The method of claim 1, wherein the content item comprises of at least one of a video file, an image file, an audio file, a music play list, a document, or a webpage.

5. The method of claim 1, wherein the data source is a camera.

6. The method of claim 5, wherein the certain proximity is defined based on a range of the camera's viewport.

7. The method of claim 6, wherein the indication comprises an indication of at least one of the first user entering the camera's viewport, the first user leaving the camera's viewport, an identification of the first user within the camera's viewport, or a relative position of the first user amongst the group of users within the camera's viewport.

8. The method of claim 7, wherein updating the display based on the received indication for the first user comprises updating the display with a graphical identification of the first user.

9. The method of claim 1, further comprising:
receiving additional indications for each of a plurality of additional users; and
updating the display to provide a visual indication of the relative physical locations of each of the additional users.

10. The method of claim 1, further comprising providing access to the shared content item to devices of each of the additional users.

11. A computer-readable medium storing instructions that when executed cause a computer to perform operations, the operations comprising:
receive data from one or more data sources for a first person of a group of people within a certain physical proximity of each other;
determine the identity of the first person based on the received data, wherein the determining of the identity of the first person is based on an identification of the first person being within a statistical confidence level;
receive an indication for the first person;
provide a graphical update for the first person based on the received indication;
receive a request from the first person to share a content item with a second person amongst the group of people; and
providing access to the content item to a device of the second person.

12. The computer-readable medium of claim 11, wherein at least one of the one or more sources is a camera.

13. The computer-readable medium of claim 11, wherein the determining of the identity of the first person is based on a facial recognition or facial tracking algorithm.

14. The computer-readable medium of claim 11, wherein the indication comprises an indication of at least one of the first person entering a camera's viewport, the first person leaving the camera's viewport, an identification of the first person within the camera's viewport, and a relative position of the first person amongst a group of people within the camera's viewport.

15. The computer-readable medium of claim 11, wherein the providing of access to the content item comprises at least one of providing a link providing access to the content item or attachment comprising the content item to the device of the second person, or sending an instant message comprising a link providing access to the content item or attachment comprising the content item to the device of the second person.

16. A computer-implemented system for providing access to a set of applications based on a user identifier, the system comprising:
one or more processors;
a memory comprising instructions which, when executed by the one or more processors, cause the one or more processors to:
receive a first set of indications for a plurality of users within a certain physical proximity of each other;
update a first graphical display based on the received first set of indications, wherein the first graphical display provides an identification of each user in the plurality of users and a relative position of each user in the plurality of users;
update a second graphical display based on the received first set of indications, wherein the second graphical display provides an aggregated content view, wherein the aggregated content view is based on content for each user in the plurality of users;
receive a request from a first user to share a content item with a second user in the plurality of users; and
provide access to the content item to a device of the second user;
wherein the first graphical display is a user shelf, and wherein the aggregated content view of the second user display is at least one of an aggregated calendar content generated based on calendar content for each user in the plurality of users, an aggregated music play list generated based on music play lists for each user in the plurality of users, and an aggregated document generated based on calendar content for each user in the plurality of users.

17. The computer-implemented system of claim 16, further comprising instructions that when executed cause the one or more processors to:
receive a second set of indications for the plurality of users; and
update the aggregated content view of the second graphical display based on the received second set of indications.

* * * * *